June 6, 1939.  W. J. KOLSTAD  2,161,300
CHUCK
Filed Oct. 8, 1936
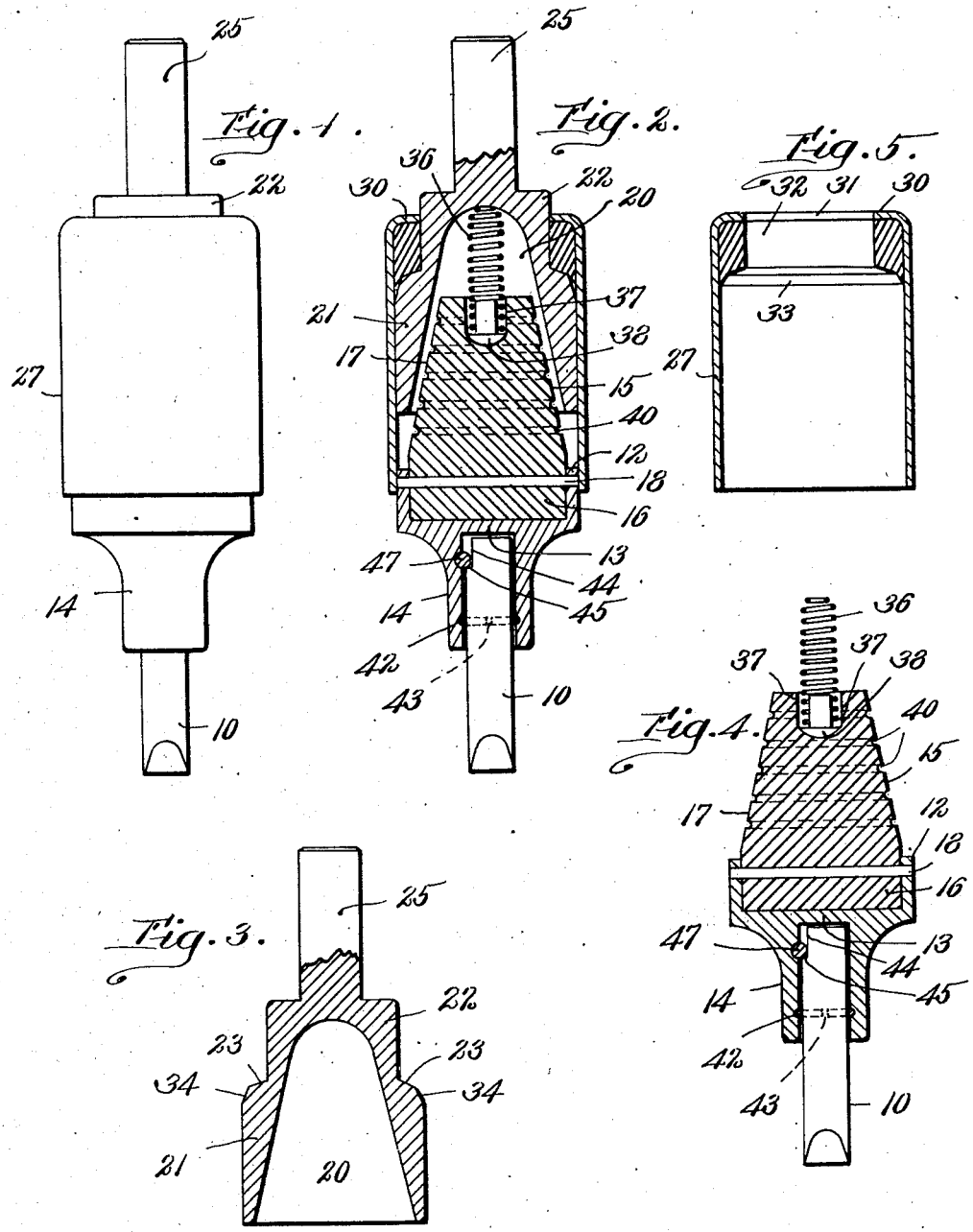
Inventor.
Welding Johan Kolstad
by Jas H. Churchill
Atty.

Patented June 6, 1939

2,161,300

UNITED STATES PATENT OFFICE 2,161,300

CHUCK

Welding Johan Kolstad, Hyde Park, Mass.

Application October 8, 1936, Serial No. 104,599

4 Claims. (Cl. 144—32)

This invention relates to a tool holding chuck for use with the rotatable spindle of a drill press or like machine.

The invention has for its object to provide a simple, efficient and inexpensive device or chuck in which a tool holder may be frictionally coupled with a rotatable driving member to be rotated therewith under one condition of use, and to be released therefrom under another condition of use, as will be described.

The invention also has for its object to provide a chuck with which different tools may be quickly and easily detachably secured to the tool holder.

The invention further has for its object to provide the tool holder with a hollow handle by means of which the tool holder is suspended from the driving member and which may be frictionally coupled with the latter so that the tool holder may be rotated with the driving member with the main coupling members in their inoperative or disengaged position, and so that the hollow handle offers a convenient means for arresting rotation of the tool holder and enable the tool to be manually engaged with the work without interfering with the rotation of the driving member.

The invention further has for its object to enable the tool holder to be automatically engaged with the work while the tool holder is being rotated by means of the hollow handle, as will be described.

These and other features of this invention will be pointed out in the claims at the end of this specification.

In the accompanying drawing, Fig. 1 is an elevation of a chuck embodying this invention, with the tool shown as a screw driver; Fig. 2 is a vertical longitudinal section of the chuck and tool shown in Fig. 1 with the parts in their normal position; Fig. 3 a detail in vertical section of the driving clutch member; Fig. 4 a detail in section of the tool holder, the tool detachably secured thereto, the driven clutch member affixed to the tool holder, and a spring for normally separating the main clutch members; Fig. 5 is a detail in vertical section of the hollow handle by which the tool holder is suspended from the driving clutch member, and the auxiliary clutch member carried by said hollow handle.

In accordance with this invention, the chuck is provided with a driving member which is secured to the rotary spindle of a drill press or other machine, and a driven member to which a tool may and preferably will be detachably secured to enable different tools to be used with the chuck. In the present instance, the tool is shown as a screw driver 10, which is detachably secured to the driven member or tool holder. The tool holder herein shown comprises a cylinder 12 closed at its bottom by a head 13 from which extends a hollow boss 14 into which the screw driver 10 is inserted and detachably secured therein to rotate with the cylinder 12 and to be readily removed therefrom when a different tool is to be used.

The cylinder 12 has secured to it a clutch member 15, herein shown as the male member of the clutch, which male member is shown as provided with a cylindrical lower portion 16 and a conical upper portion 17. The clutch member 15 may and preferably will be made of leather, fibre or like material and is firmly secured to the tool holder by a pin 18 extended through the cylinder 12 and the cylindrical lower portion 16 of the clutch member 15.

The male clutch member 15 extends into a conical recess or chamber 20 in a female clutch member 21, preferably made of steel or other metal and of cylindrical exterior and provided at its upper end with a cylindrical extension 22, which is centrally located and of smaller diameter than the female member 21 to provide the latter with an annular shoulder 23, upon which the male clutch member 15 is normally supported, with the male clutch member separated from the female member after the manner represented in Fig. 2. The extension 22 has affixed thereto a shank or stem 25, which is designed to be secured to the rotatable spindle, not shown, of a drill press or other machine of known construction and commonly used in machine shops.

The male clutch member 15 may be suspended from the female clutch member 21 by a cylinder 27 preferably of metal and which is open at its lower end and of such internal diameter as will make a driving fit with the cylindrical portion 12 of the tool holder, after manner represented in Fig. 2, so as to enable the tool holder to rotate with the cylinder 27 with the clutch members 15, 21 in their disengaged condition, shown in Fig. 2. The tool holder 12 is engaged with the cylinder 27 by sufficient friction to enable the tool holder to be rotated with the cylinder 27, but also to enable rotation of the tool holder to be stopped or arrested by the operator grasping the cylinder 27 and holding it from rotating with the driving clutch member 21 with the clutch members 15 and 21 in their disengaged position represented in Fig. 2, or the cylinder 27 may be otherwise secured to the tool holder. The cylinder 27 thus constitutes a hollow handle for the tool holder, which affords a convenient and a relatively large member for the operator to grasp and turn the screw driver or other tool and engage it with the work or to so position the tool with relation to the work that it will automatically be engaged therewith, when the operator releases the handle or cylinder 27.

Provision is also made for rotating the tool holder and its handle with the spindle and the driving clutch member, when the clutch members 15, 21 are in their normal or separated condition, shown in Fig. 2. To this end, the hollow handle 27 is provided at its upper end with a head 30, having a central opening 31 through which the extension 22 of the driving member 21 is extended, and which extension is frictionally engaged with a leather or like washer or bushing 32 carried by the hollow handle and interposed between the head 30 of the handle and the shoulder 23 on the driving clutch member 21 as shown in Fig. 2. The washer or bushing 32 may and preferably will have on its under side a beveled lip 33 with which cooperates a beveled edge 34 on the driving clutch member 21.

By reference to Fig. 2 it will be seen that the washer or bushing forms an auxiliary frictional clutch member, which couples the tool holder with the driving clutch member 21 and the spindle to which the shank 25 is secured, so that in the normal or separated position of the main clutch members 15, 21 the tool holder 12 may be rotated with the spindle independently of the main clutch members, which enables the tool holder to be rotated with the spindle as the tool holder is being advanced or moved toward the work.

It will be observed that the cylinder 27 has a double function, in that it constitutes a handle for the tool holder and also as a housing for the auxiliary clutch member 32. The members 15, 21 of the main clutch are normally separated by a spring 36 which is interposed between the main clutch members and is compressed to permit the clutch members to be engaged. In the present instance, a helical spring is shown which has one end extended into a recess 37 in the apex of the male clutch member 15 and bears against an antifriction button 38 having a rounded head which engages the rounded bottom wall of the recess 37, and has a stem 39 which extends into the lower end of the helical spring 36. The upper end of the spring 36 bears against the top wall of the conical recess 20 in the female clutch member. The conical male member 15 of the main clutch, may and preferably will be provided with a plurality of annular grooves 40, which are spaced apart and which serve to subdivide the exterior surface of the conical male clutch member into zones to facilitate the progressive and gradual contact of the female member with the male member and thus enable the screw driver or other tool to be rotated or turned gently when first brought into contact with the head of the screw or other work, until the tool is properly positioned with relation to the work and into position to enable the screw driver to be forced by the spring 36 into the slot in the head of a screw, or in the case of a socket wrench to engage the head of a bolt on its sides, and thus have the tool firmly and properly engaged with the work to effect the desired rotation thereof until the work has been turned into its final or desired position. When the screw, bolt or other work has been turned into its final position, the resistance offered by the work to further turning is such as to overcome the frictional engagement of the main clutch members 15, 21, and thereby cause the driving clutch member 21 to slip on the driven clutch member 15. When this occurs, the operator removes the downward pressure upon the spindle and shank 15, which permits the spring 36 to disengage the driving clutch member 21 from the driven clutch member 15 and bring the driving clutch member into engagement with the auxiliary clutch member 32 carried by the handle 27 of the tool holder, after which the chuck may be lifted as a unit, and a new piece of work positioned for a second operation.

The tool 10 may and preferably will be detachably secured in the hollow boss 14 of the tool holder by a split ring 42 located in an annular groove 43 in said boss. The tool 10 is arranged to be rotated with the tool holder while permitting its ready disengagement therefrom. This may be accomplished as herein shown by making the upper portion or shank of the tool smaller than the internal diameter of the hollow boss 14 and providing said smaller portion with a vertical wall 44 and with a horizontal wall 45 which cooperate with a projection on the inner side of the hollow boss 14. The projection may be conveniently provided by a pin 47, which is driven into a hole formed transversely of the hollow boss and arranged so as to cut the inner wall of the hollow boss and allow a portion of the pin to project into the hollow boss, wherein it cooperates with horizontal wall 45 on the shank of the tool to limit the movement of the tool into the hollow boss, and cooperates with the vertical wall 44 to prevent rotation of the tool within the hollow boss, and thereby practically key the tool to the tool holder, without interfering with the ready removal of the tool.

From the above description, it will be observed that the driving clutch member, which in the present instance is the female member 21 of the main clutch, cooperates with the auxiliary clutch member 32 to rotate the tool holder as the latter is advanced toward the work, until the tool carried by the tool holder meets the work, whereupon the tool holder continues to be rotated and the tool is aligned with the work, whereupon the tool is forced by the spring 36 into proper engagement with the work to rotate or turn the same, which is effected by engagement of the driving clutch member 21 with the driven clutch member 15, which occurs at or about the time the tool is properly engaged with the work. The work is then turned or rotated by the members 21 and 15 of the main clutch, until the screw or other work has been brought into its operative position, whereupon the tool, its holder and the driven clutch member 15 become stationary, and the driving clutch member 21 slips upon the driven member 15 and allows the driving clutch member 21 and the spindle to which it is secured, to continue rotating without rotating the screw or other work, thereby avoiding injury to the work.

The extension 22 of the driving clutch member is made long enough to enable it to remain in engagement with the inner wall of the auxiliary clutch member 32, while the shoulder 23 of the main clutch member is being removed from contact with auxiliary clutch member and is brought into sufficiently firm contact with the driven member 15 of the main clutch to effect rotation of the tool holder and its tool.

One embodiment of the invention is herein shown but it is not desired to limit the invention to the particular embodiment shown.

Having thus described the invention, what is claimed is:

1. A chuck having, in combination, a rotatable driving member, a tool holder, and an interposed clutch composed of a female member affixed to said rotatable driving member, a male member affixed to said tool holder and frictionally engaged with said female member, and a hollow handle for said tool holder provided with an auxiliary frictional clutch member suspended from said female member and rotatable therewith under one condition of use and also independently thereof under another condition of use.

2. A chuck having, in combination, a rotatable tool holder, a frictional driven clutch member affixed to said tool holder, a frictional driving clutch member movable toward and from said driven clutch member, and an auxiliary frictional clutch member connected with said tool holder and cooperating with said driving clutch member to enable the latter to rotate the tool holder independently of the driven clutch member affixed to said tool holder.

3. A chuck having, in combination, a tool holder provided with a cylindrical upper portion and a hollow boss, a clutch member having a cylindrical portion secured to the cylindrical portion of the tool holder and having a conical upper portion extended from said cylindrical portion, a tool detachably secured in said hollow boss, and a driving clutch member having a conical recess into which the conical portion of the driven clutch member is extended to rotate said tool holder in one position of operation, said driving clutch member also being provided with an outer driving surface, an auxiliary clutch member comprising an annular member affixed to said tool holder and adapted to engage said outer driving surface to rotate said tool holder when the parts are in a second position of operation.

4. A chuck having, in combination, a driving and a driven clutch member, a tool holder affixed to the driven clutch member to rotate therewith as a unit, a hollow handle affixed to said tool holder to rotate therewith, and an auxiliary clutch member carried by said handle and cooperating with the driving clutch member to enable the hollow handle and the tool holder to be rotated by the driving clutch member independently of the driven clutch member affixed to said tool holder.

WELDING JOHAN KOLSTAD.